United States Patent
Malladi et al.

(10) Patent No.: US 9,712,847 B2
(45) Date of Patent: Jul. 18, 2017

(54) LOW-COMPLEXITY REMOTE PRESENTATION SESSION ENCODER USING SUBSAMPLING IN COLOR CONVERSION SPACE

(75) Inventors: Krishna Mohan Malladi, San Jose, CA (US); B. Anil Kumar, Saratoga, CA (US); Nadim Y. Abdo, Redmond, WA (US); Sridhar Sankuratri, Campbell, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 317 days.

(21) Appl. No.: 13/237,859

(22) Filed: Sep. 20, 2011

(65) Prior Publication Data
US 2013/0070844 A1    Mar. 21, 2013

(51) Int. Cl.
*H04N 7/26* (2006.01)
*H04N 19/88* (2014.01)
(Continued)

(52) U.S. Cl.
CPC ........... *H04N 19/88* (2014.11); *H04N 19/103* (2014.11); *H04N 19/136* (2014.11);
(Continued)

(58) Field of Classification Search
CPC . H04N 7/26; H04N 7/01; H04N 11/20; H04N 17/24; H04N 7/24; H04N 19/61;
(Continued)

(56) References Cited

U.S. PATENT DOCUMENTS

| | | | | |
|---|---|---|---|---|
| 5,384,912 A | * | 1/1995 | Ogrinc | ................. G06F 17/175 345/501 |
| 5,594,503 A | * | 1/1997 | Miyazawa | ........... G06K 9/6251 348/414.1 |

(Continued)

FOREIGN PATENT DOCUMENTS

| JP | 2004-535126 A | 11/2004 |
|---|---|---|
| JP | 2005-160048 A | 6/2005 |

(Continued)

OTHER PUBLICATIONS

International application No. PCT/US2012/054702: International Search Report and Written Opinion, Jan. 3, 2013, 8 pages.

(Continued)

*Primary Examiner* — Jay Patel
*Assistant Examiner* — Joseph Suh
(74) *Attorney, Agent, or Firm* — Baker & Hostetler LLP

(57) ABSTRACT

An invention is disclosed for encoding and decoding data in a 4:4:4 subsampling scheme, using an encoder/decoder that is not configured to encode or decode data in 4:4:4. In embodiments, an encoder planararizes an input frame into three component frames in a 4:0:0 scheme. The encoder then encodes each component frame in the 4:0:0 scheme, and aggregates the encoded component frames into a bit stream. A decoder receives such a bit stream, and decodes it with a component not configured to decode data in 4:4:4. The decoder decodes the bit stream to produce a representation of the three component frames in 4:0:0, then aggregates the three component frames into a representation of the original frame in 4:4:4.

19 Claims, 11 Drawing Sheets

(51) Int. Cl.
*H04N 19/70* (2014.01)
*H04N 19/186* (2014.01)
*H04N 19/103* (2014.01)
*H04N 19/136* (2014.01)
*H04N 19/156* (2014.01)
*H04N 19/124* (2014.01)
*H04N 19/146* (2014.01)

(52) U.S. Cl.
CPC ......... *H04N 19/156* (2014.11); *H04N 19/186* (2014.11); *H04N 19/70* (2014.11); *H04N 19/124* (2014.11); *H04N 19/146* (2014.11)

(58) Field of Classification Search
CPC .... H04N 19/88; H04N 19/103; H04N 19/136; H04N 19/156; H04N 19/70; H04N 19/186; H04N 19/124; H04N 19/146
USPC ...................................................... 375/240.3
See application file for complete search history.

(56) References Cited

U.S. PATENT DOCUMENTS

| | | | |
|---|---|---|---|
| 5,768,429 A * | 6/1998 | Jabbi | G06T 9/007 382/232 |
| 5,801,788 A * | 9/1998 | Ashida | H04N 5/45 348/565 |
| 5,894,300 A * | 4/1999 | Takizawa | G09G 5/02 345/545 |
| 5,905,536 A * | 5/1999 | Morton | H04N 9/641 348/441 |
| 6,043,845 A * | 3/2000 | Thompson | G06F 3/14 348/502 |
| 6,091,777 A * | 7/2000 | Guetz | H04N 19/172 375/240.03 |
| 6,166,777 A * | 12/2000 | Ock | H04N 5/45 348/558 |
| 6,661,422 B1 * | 12/2003 | Valmiki | G06T 9/007 345/530 |
| 6,665,446 B1 * | 12/2003 | Kato | G06T 9/001 375/E7.04 |
| 6,707,853 B1 * | 3/2004 | Cook | H04N 19/51 348/E5.108 |
| 6,829,301 B1 * | 12/2004 | Tinker | H04N 19/63 375/240.12 |
| 7,103,226 B1 * | 9/2006 | Frank | H04N 19/40 345/603 |
| 7,460,725 B2 | 12/2008 | Malladi et al. | |
| 7,545,989 B1 * | 6/2009 | Dumitras | G06T 7/40 382/233 |
| 7,929,608 B2 | 4/2011 | Krishnan | |
| 7,973,806 B2 | 7/2011 | Kuno | |
| 2001/0014176 A1 * | 8/2001 | Kamada | G06K 9/00456 382/181 |
| 2002/0048407 A1 * | 4/2002 | Ukita | H04N 1/41 382/239 |
| 2002/0090140 A1 * | 7/2002 | Thirsk | G06T 9/00 382/239 |
| 2002/0135683 A1 * | 9/2002 | Tamama | G06T 1/60 348/222.1 |
| 2002/0196483 A1 * | 12/2002 | Tsujino | H04N 5/2351 358/520 |
| 2003/0016754 A1 * | 1/2003 | Gandhi | H04N 19/61 375/240.24 |
| 2003/0151610 A1 * | 8/2003 | Kuriakin | G09G 5/42 345/589 |
| 2004/0101047 A1 * | 5/2004 | Yang | H04N 5/145 375/240.08 |
| 2004/0109086 A1 * | 6/2004 | Mathew | H04N 9/67 348/453 |
| 2004/0183919 A1 * | 9/2004 | Yamamoto | H04N 9/045 348/222.1 |
| 2004/0189677 A1 | 9/2004 | Amann et al. | |
| 2004/0189838 A1 * | 9/2004 | Sasaki | H04N 5/367 348/242 |
| 2004/0225221 A1 * | 11/2004 | Olsson | A61B 8/08 600/447 |
| 2004/0228415 A1 * | 11/2004 | Wang | H04N 19/86 375/240.29 |
| 2005/0060754 A1 * | 3/2005 | Simyon | H04L 29/06 725/112 |
| 2005/0062755 A1 | 3/2005 | Van Dyke et al. | |
| 2005/0089235 A1 * | 4/2005 | Sakaguchi | H04N 19/176 382/239 |
| 2005/0134744 A1 * | 6/2005 | Shan | H04N 9/78 348/670 |
| 2005/0206784 A1 * | 9/2005 | Li | H04N 19/61 348/441 |
| 2005/0219252 A1 * | 10/2005 | Buxton | G09G 5/363 345/542 |
| 2005/0259113 A1 * | 11/2005 | Endo | G09G 5/04 345/604 |
| 2006/0008154 A1 * | 1/2006 | Belle | H04N 19/59 382/232 |
| 2006/0069797 A1 | 3/2006 | Abdo et al. | |
| 2006/0159357 A1 * | 7/2006 | Mizuno | H04N 19/647 382/239 |
| 2006/0197768 A1 * | 9/2006 | Van Hook | G06T 15/005 345/546 |
| 2006/0282855 A1 | 12/2006 | Margulis | |
| 2007/0071342 A1 * | 3/2007 | Bilbrey | G06T 5/50 382/254 |
| 2007/0097130 A1 * | 5/2007 | Margulis | G06F 3/1431 345/501 |
| 2007/0133899 A1 * | 6/2007 | Rai | G06K 9/4652 382/276 |
| 2007/0195106 A1 * | 8/2007 | Lin | G06T 1/0042 345/589 |
| 2008/0112489 A1 * | 5/2008 | Malladi | H04N 19/176 375/240.22 |
| 2008/0123736 A1 * | 5/2008 | Sekiguchi | H04N 19/66 375/240.01 |
| 2008/0304567 A1 | 12/2008 | Boyce et al. | |
| 2009/0052772 A1 | 2/2009 | Speirs et al. | |
| 2009/0080534 A1 | 3/2009 | Sekiguchi et al. | |
| 2009/0238198 A1 * | 9/2009 | Niu | H04N 19/42 370/412 |
| 2010/0061462 A1 | 3/2010 | Ichiki | |
| 2010/0074521 A1 * | 3/2010 | Gomi | H04N 13/0018 382/167 |
| 2010/0080283 A1 * | 4/2010 | Ali | H04N 19/59 375/240.01 |
| 2010/0118947 A1 * | 5/2010 | Goetting | H04N 19/60 375/240.12 |
| 2010/0166075 A1 * | 7/2010 | Lee | H04N 19/176 375/240.16 |
| 2010/0188482 A1 * | 7/2010 | Routhier | H04N 13/0029 348/43 |
| 2010/0208989 A1 * | 8/2010 | Narroschke | H04N 1/646 382/166 |
| 2010/0232691 A1 | 9/2010 | Sekiguchi et al. | |
| 2011/0078532 A1 | 3/2011 | Vonog et al. | |
| 2011/0145431 A1 * | 6/2011 | Momchilov | H04L 65/605 709/231 |
| 2011/0274371 A1 * | 11/2011 | Hsieh | G06T 3/4007 382/300 |
| 2012/0008679 A1 * | 1/2012 | Bakke | H04N 19/186 375/240.08 |
| 2012/0120245 A1 * | 5/2012 | Zhao | G06T 5/003 348/164 |
| 2012/0133826 A1 * | 5/2012 | Takahashi | H04N 1/40068 348/441 |
| 2012/0136612 A1 * | 5/2012 | Vanderhoff | H04N 17/004 702/119 |
| 2013/0106998 A1 * | 5/2013 | Pahalawatta | H04N 13/0029 348/43 |

(56) References Cited

U.S. PATENT DOCUMENTS

2013/0128691 A1* 5/2013 Martins .............. G01S 15/8995
367/7

FOREIGN PATENT DOCUMENTS

| JP | 2010-068103 A | 3/2010 |
|---|---|---|
| RU | 2009131597 A | 2/2011 |
| WO | WO 03/007126 A2 | 1/2003 |
| WO | WO 2007/034601 A1 | 3/2007 |
| WO | 2007/111476 A1 | 10/2007 |
| WO | WO 2010/004726 A1 | 1/2010 |

OTHER PUBLICATIONS

Jan Ozer, "Video Compression for Flash, Apple Devices and HTML5", Doceo Publishing, May 2, 2011, pp. 110-113.
Iain Richardson, "Video Codec Design", John Wiley & Sons, May 13, 2002, pp. 12-15.
"Search Report Issued in European Patent Application No. 12834028.8", Mailed Date: Apr. 17, 2015, 11 Pages.
Yu, Haoping, "Performance Improved 4:4:4 coding for MPEG-4p10/H.264", In Joint Video Team (JVT) of ISO/IEC MPEG & ITU-T VCEG, Apr. 16, 2005, 18 Pages.
Kim, et al., "SEI message for Independent Color Component Coding", In Joint Video Team (JVT) of ISO/IEC MPEG & ITU-T VCEG, Mar. 31, 2006, 6 Pages.
Lan, et al., "Intra and Inter coding tools for screen contents", In Joint Collaborative Team on Video Coding, Mar. 16, 2011, 11 Pages.
Peterson, et al., "An Improved Detection Model for Dct Coefficient Quantization", In Proceedings of the Internationa Society for Optical Enoineering ,vol. 1913, Feb. 1, 1993, pp. 191-201.
Richardson, et al., "Virtual Network Computing", In IEEE Internet Computing, vol. 2, Issue 1, Jan. 1, 1998, 6 Pages.
Wu, et al., "Rate Control Scheme for H.264/AVC", In Joint Video (JVT) of ISO/IEC MPEG & ITU-T VCEG, Apr. 16, 2005, 16 Pages.
Yamada, et al., "A Consideration on Intra Coding Efficiency of the High 4:4:4 profile", In Joint Video Team (JVT) of ISO/IEC MPEG & ITU-T VCEG, Jul. 23, 2005, 4 Pages.
"H.264 Video Compression Standard", New possibilities within video surveillance, White Paper, Axis Communications, Copyright 2008, 1-10.
Jiang et al., "Low-delay Rate Control for Real-Time H.264/AVC Video Coding", IEEE Transactions on Multimedia, Jun. 2006, 8(3), 467-477.
Jing et al., "Frame Complexity-Based Rate-Quantization Model for H.264/AVC Intraframe Rate Control", IEEE, Signal Processing Letters, 2008, 15, 373-376.
Tan et al., "A Remote Thin Client System for Real Time Multimedia Streaming over VNC", IEEE International Conference on Multimedia and Expo (ICME), Jul. 19-30, 2010, 992-997.
Adamrocker; "Android"; Nikkei Software; vol. 14 No. 6; Apr. 2011; p. 126-133.
Japan Patent Application No. 2014-531861; Reason for Rejection; dated Oct. 18, 2016; 10 pages (contains English Translation).

* cited by examiner

LOW-COMPLEXITY REMOTE PRESENTATION SESSION ENCODER USING SUBSAMPLING IN COLOR CONVERSION SPACE

BACKGROUND

In a remote presentation session, a client computer and a server computer communicate across a communications network. The client sends the server locally-received input, such as mouse cursor movements and keyboard presses. In turn, the server receives this input and performs processing associated with it, such as executing an application in a user session. When the server performs processing that results in output, such as graphical output or sound, the server sends this output to the client for presentation. In this manner, applications appear to a user of the client to execute locally on the client when they, in fact, execute on the server.

The amount of graphics data that is a server typically generates in a remote presentation session may exceed the amount of communications network bandwidth available between the server and the client. In view of this restriction of bandwidth, a server will typically compress the graphics data before sending it to the client. In some embodiments, the server will also encode the graphics data as a video stream before sending it to the client. There are many problems with known techniques for compressing and encoding graphics data as a video stream in a remote presentation session, some of which are well known.

SUMMARY

One problem with known techniques for compressing and encoding graphics data as a video stream in a remote presentation session is that using the known techniques degrades image fidelity in a way that negatively impacts user experience. For instance, some encoders (such as H.264 encoders) encode graphics data with a subsampling technique that does not sample each value of each pixel (e.g. some encoders subsample in a scheme where not every chrominance value is individually sampled from a pixel represented as a luminance and two chrominance values, such as 4:2:2, 4:2:1, and 4:2:0 schemes). As used herein, references to a 4:2:0 or other non-4:4:4 subsampling scheme may generally apply to non-4:4:4 subsampling schemes. When these encoders subsample data in this manner, some of the data is lost, which reduces fidelity of the image.

This reduction of fidelity is generally perceptible by people when it occurs in high-contrast/high-frequency portions of images, such as dark text on a light colored background. This loss of fidelity is generally perceptible in such images because two or more adjacent pixels with very different colors (e.g. a pixel of the white background and a pixel of the black text) may have their value averaged, or otherwise combined together, to create a shared subsampled value. This averaging or combining of values reduces the crispness of the border between the high contrast areas.

It may be dis-favorable to address this reduction of fidelity in 4:2:0 encoding by reconfiguring an encoder that is configured to perform 4:2:0 subsampling to also perform 4:4:4 subsampling. It may be dis-favorable to reconfigure such an encoder this way because doing so would dis-favorably increase the complexity of the encoder. Additionally, there are many currently deployed decoders that are not configured to decode a frame subsampled with a 4:4:4 scheme, and reconfiguring an encoder to support 4:4:4 may also necessitate reconfiguring and redeploying the corresponding decoder to many computers. In view of this issue with reconfiguring the encoder, embodiments of the invention may be used to encode an image in a 4:4:4 scheme using an encoder configured to encode in a 4:2:0 scheme (but not a 4:4:4 scheme). Embodiments of the invention may also be used to use a decoder configured to decode in a 4:2:0 scheme (but not a 4:4:4 scheme) to decode an image encoded with the above encoder to produce an image in a 4:4:4 scheme.

Embodiments of the invention are implemented in a remote presentation server. In embodiments, a server receives a frame of graphics data in RGB color space (where pixels are represented by a triplet of a red, green, and blue value). The server converts the frame to YUV color space (where pixels are represented by a triplet of a luminance—Y—and two chrominance values—U and V), and creates three component frames from the YUV frame—one frame each for the Y, U, and V components of the frame in a 4:0:0 subsampling scheme. The server then encodes each of the component frames as video with an encoder that is not configured to encode frames in a 4:4:4 subsampling scheme but is configured to encode frames in a 4:0:0 subsampling scheme. The server then aggregates each component frame into a bit stream, and sends the bit stream to a client via a remote presentation session protocol.

Embodiments of the invention are also implemented in a remote presentation session client. In embodiments, a client receives RDP bit stream data from a server (where the data comprises separate Y, U, and V component frames). The client decodes the bit stream with a decoder that is configured to decode frames in a 4:0:0 subsampling scheme, but not in a 4:4:4 subsampling scheme, to produce the three component frames—Y, U, and V—in a 4:0:0 subsampling scheme. The client then aggregates these three component frames in a 4:0:0 subsampling scheme to produce a YUV frame in a 4:4:4 subsampling scheme. The client converts the YUV frame to RGB color space and displays the RGB frame on a display device.

Embodiments of the invention enable encoding and sending data in a 4:4:4 subsampling scheme using an encoder and decoder that are not configured to support a 4:4:4 subsampling scheme. By separating the frame into component frames, the frame is divided into three frames in a format—4:0:0—that the encoder and decoder are configured to support. Separating the frame into component frames enables sending data in a 4:4:4 subsampling scheme without re-configuring the encoder or decoder. Furthermore, there are scenarios where a server will transmit both 4:4:4 frames and 4:2:0 frames to a client for display. This invention enables both formats to be encoded and decoded using less complex encoders that are not additionally configured to also support the 4:4:4 subsampling scheme.

DETAILED DESCRIPTION OF ILLUSTRATIVE EMBODIMENTS

Figure 1:
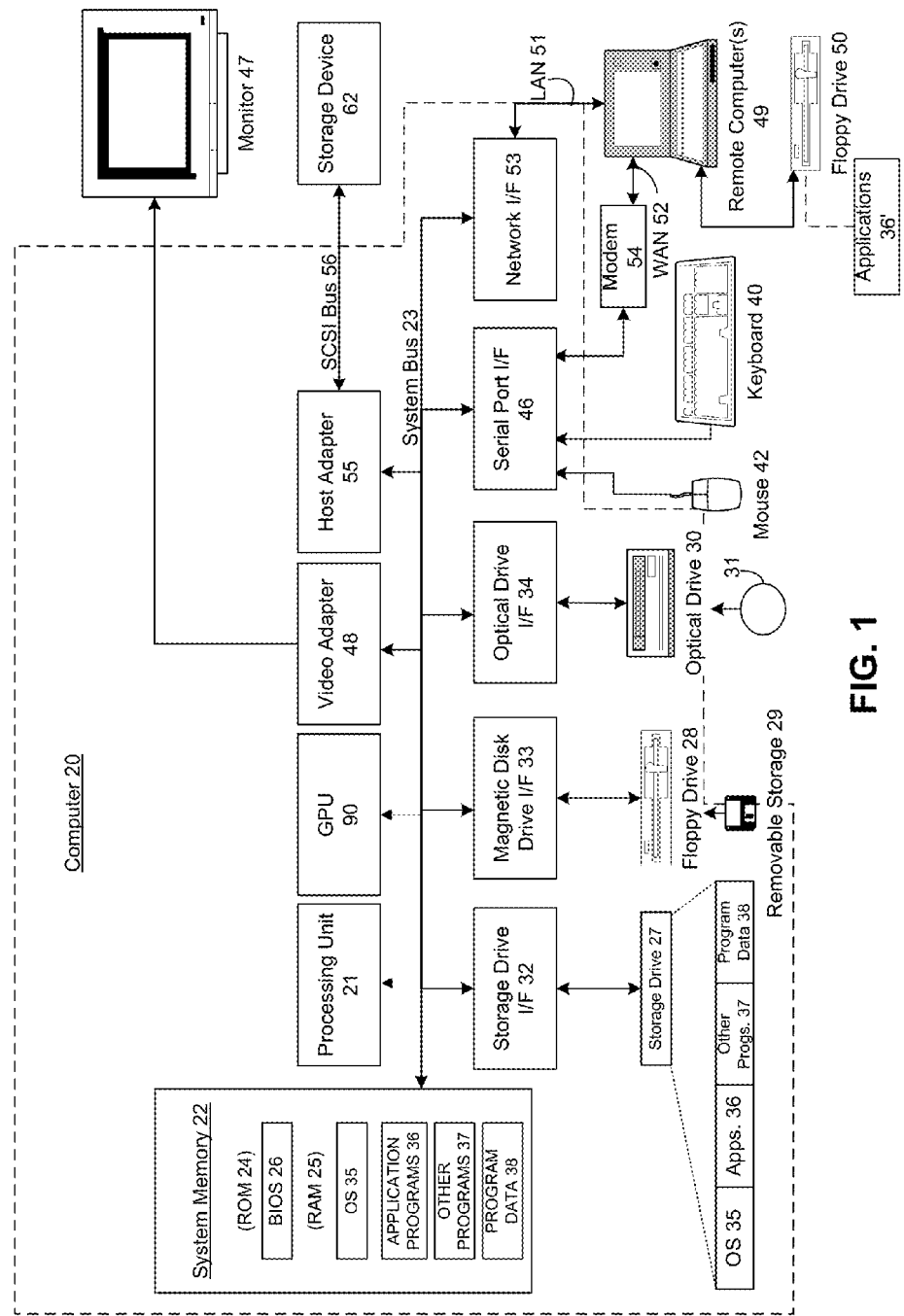
FIG. 1 depicts an example general purpose computing environment in which embodiments of the invention may be implemented.

Certain specific details are set forth in the following description and figures to provide a thorough understanding of various embodiments of the disclosure. Certain well-known details often associated with computing and software technology are not set forth in the following disclosure to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure.

It should be understood that the various techniques described herein may be implemented in connection with hardware or software or, where appropriate, with a combination of both. Thus, the methods and apparatus of the disclosure, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The term circuitry used throughout the disclosure can include hardware components such as hardware interrupt controllers, hard drives, network adaptors, graphics processors, hardware based video/audio codecs, and the firmware/software used to operate such hardware. The term circuitry can also include microprocessors configured to perform function(s) by firmware or by switches set in a certain way or one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be executed by a logical processor. Since one skilled in the art can appreciate that the state of the art has evolved to a point where there is little difference between hardware, software, or a combination of hardware/software, the selection of hardware versus software to effectuate functions is merely a design choice. Thus, since one of skill in the art can appreciate that a software process can be transformed into an equivalent hardware structure, and a hardware structure can itself be transformed into an equivalent software process, the selection of a hardware implementation versus a software implementation is left to an implementer.

Embodiments of the invention may execute on one or more computer systems. FIG. 1 and the following discussion are intended to provide a brief general description of a suitable computing environment in which embodiments of the invention may be implemented.

FIG. 1 depicts an example computing system. The computing system may include a computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
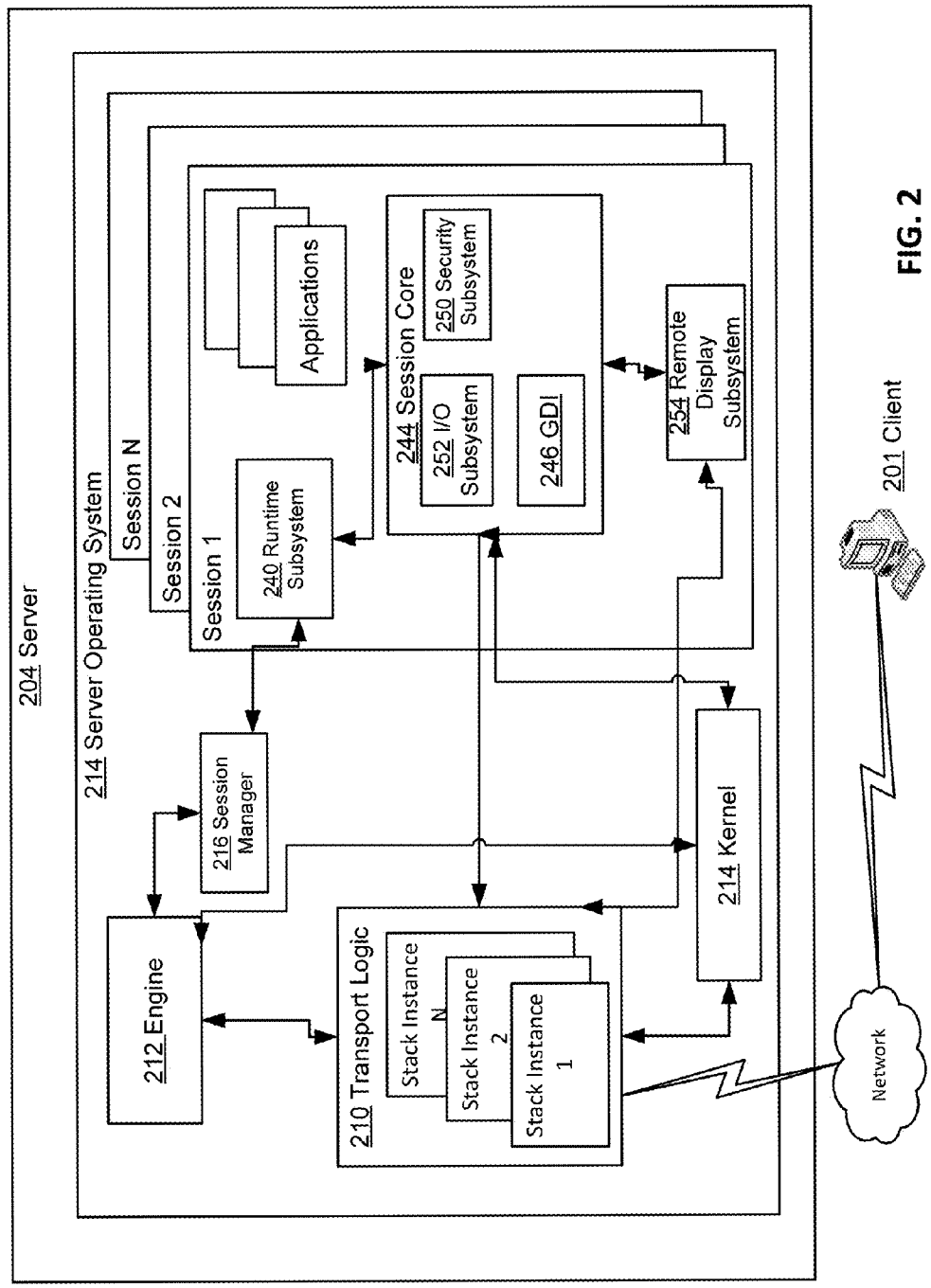
FIG. 2 depicts an example remote presentation session server in which embodiments of the invention may be implemented.

FIG. 2 generally illustrates an example environment wherein aspects of the present invention can be implemented. For instance, server 204 may implement the operational procedures of FIGS. 8-9 and client 201 may implement the operational procedures of FIGS. 10-11. One skilled in the art can appreciate that the example elements depicted by FIG. 2 are illustrated to provide an operational framework for describing the present invention. Accordingly, in some embodiments the physical layout of each environment may be different depending on different implementation schemes. Thus the example operational framework is to be treated as illustrative only and in no way limit the scope of the claims.

Depicted in FIG. 2 is server 204, which may include circuitry configured to effectuate a remote presentation session server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present invention can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present invention can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a remote presentation session server, the remote display subsystem 254 can be configured to include virtual display driver(s) that may not be associated with displays physically attacked to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present invention, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Figure 3:
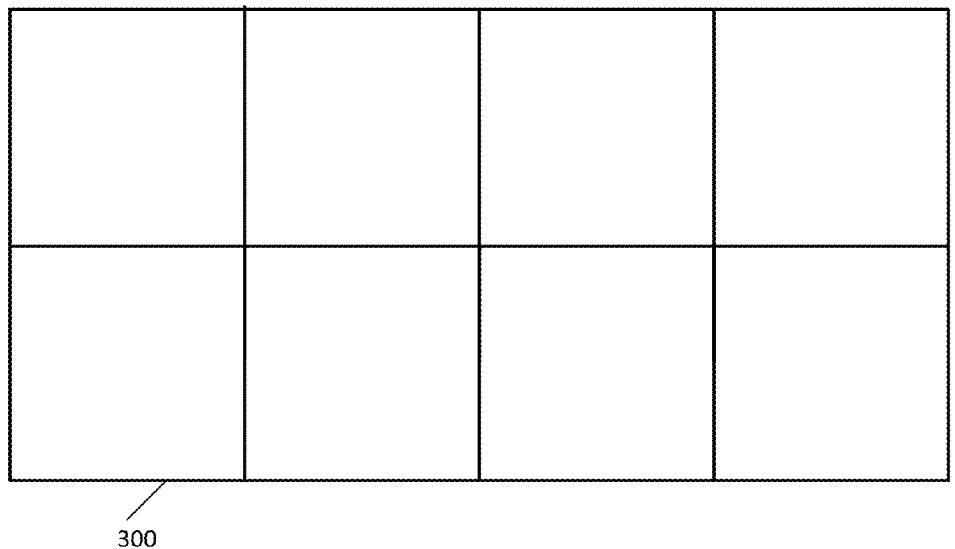
FIG. 3 depicts an example image sampled in 4:4:4 format.
Figure 3:
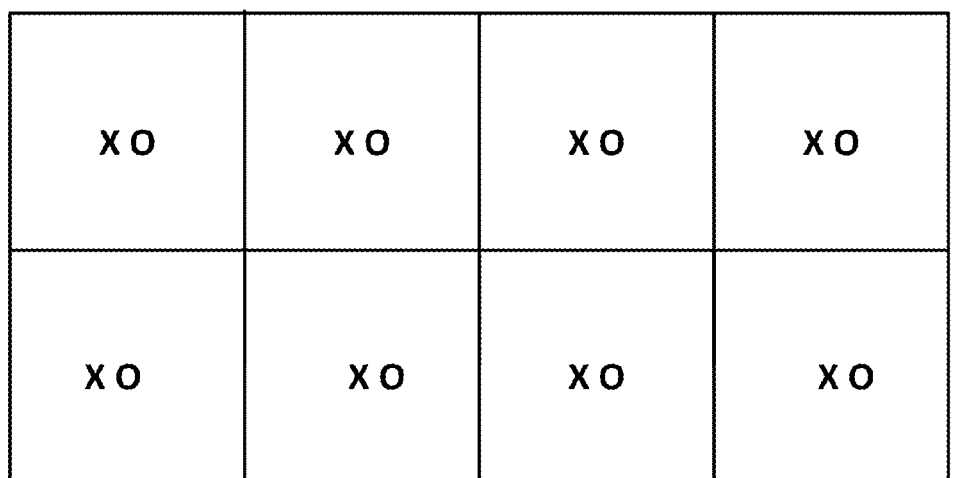

FIG. 3 depicts an example image subsampled in a 4:4:4 scheme. Each of the numbers in 4:4:4 (as well as other subsampling schemes) refers to an amount of subsampling that is performed on the source image. The subsampling may be more generally expressed as J:a:b subsampling, where J refers to the number of pixels in a row of the sampled region as well as a number of luminance samples taken (Y in YUV color space), a refers to the number of chrominance samples taken in the first row of J pixels (U and V in YUV color space), and b refers to the number of chrominance samples taken in the second row of J pixels in addition to the number a (the b chrominance samples may also be of U and V in YUV color space).

Image 300 is an example image from which the subsampled image 302 is produced. Image 300 has a width/row of 4 pixels, and a height/column of 2 pixels. The number of pixels remains the same between image 300 and sampled image 302—a width of 4 pixels and a height of 2 pixels. Each pixel of image 300 has been separately sampled for luminance in image 302—the marking of a pixel with an "x" signifying that pixel being sampled for luminance. Additionally, each pixel of image 300 has been separately sampled for chrominance in image 302—the marking of a pixel with an "o" signifying that pixel being sampled for chrominance.

Sampled image 302 represents a 4:4:4 sample of image 300 because J, a, and b each equal 4. J is 4 because the sampled area in question is four pixels wide. a is 4 because the top row is sampled 4 separate times for chrominance—once per pixel. b is also 4 because the bottom row is sampled an additional 4 separate times for chrominance (an additional 4 separate times relative to the 4 chrominance samples taken of the top row).

Figure 4:
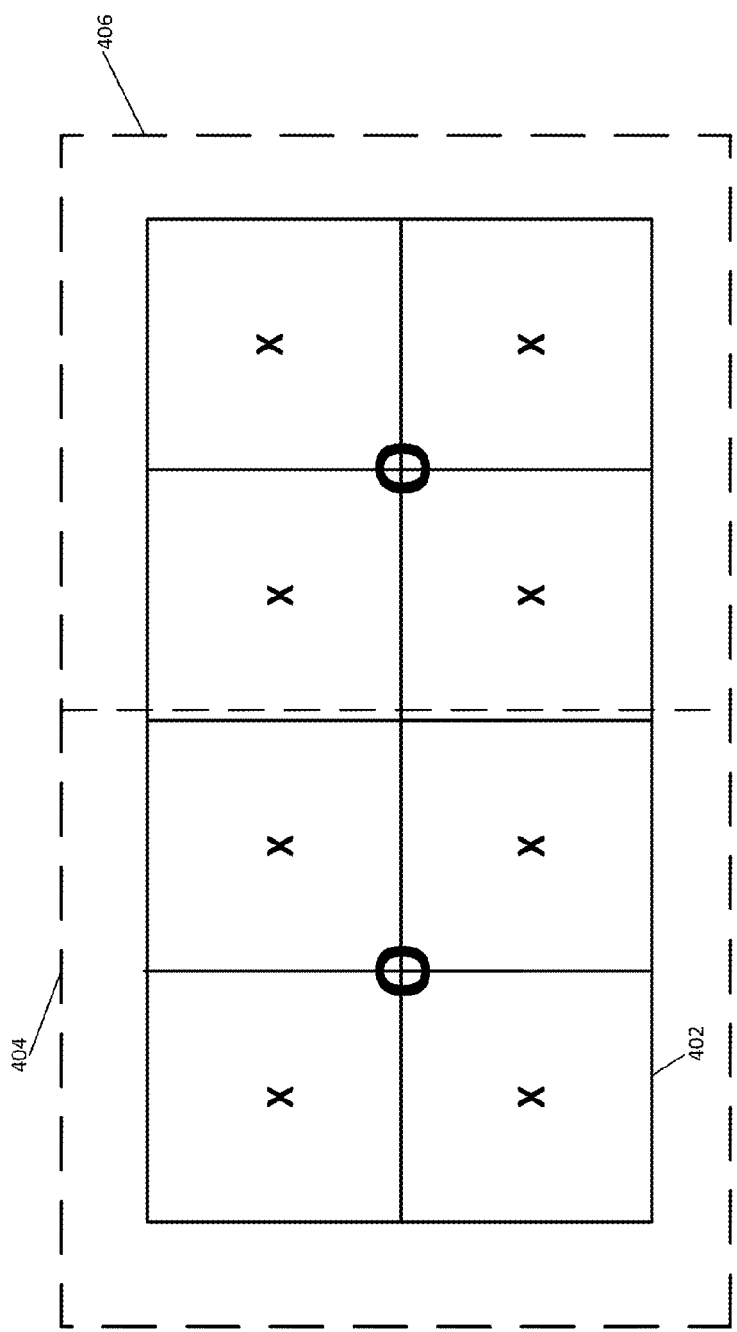
FIG. 4 depicts the example image of FIG. 3 sampled in 4:2:0 format.

FIG. 4 depicts the example image 300 of FIG. 3 sampled in 4:2:0 format. 4:2:0 subsampling differs from the 4:4:4 subsampling depicted in image 302 of FIG. 3 because fewer chrominance samples are taken of image 300. Here, only two chrominance samples are taken for the collective 8 pixels, as depicted in 4:2:0 subsampled image 402. In a 4:2:0 subsampling scheme, a is 2, so there are two chrominance samples taken in the top row. Additionally, b is 0, so there are no additional chrominance samples taken in the bottom row. That is, there is one chrominance sample taken for the left quartet of pixels 404, and one chrominance sample taken for the right quartet of pixels 406. As can be seen between a comparison of 4:4:4 subsampled image 302, and 4:2:0 subsampled image 402, a 4:2:0 subsampling scheme may generally allow for an image to be stored in a smaller amount of data, with an accompanying loss of fidelity. 4:4:4 subsampled image 302 contains 16 samples—8 for the luminance and 8 for the chrominance. 4:2:0 subsampled image 402 contains 10 samples—8 for the luminance and 2 for the chrominance.

Figure 5:
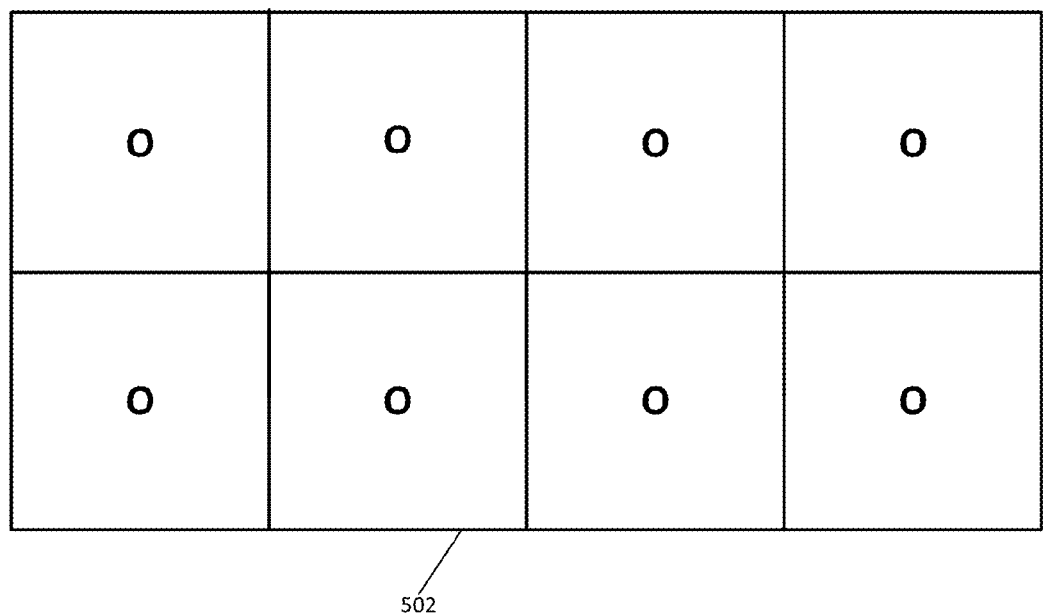
FIG. 5 depicts the example image of FIG. 3 sampled in 4:0:0 format.

FIG. 5 depicts the example image 300 of FIG. 3 subsampled in a 4:0:0 scheme. As depicted, each of the 8 pixels in 4:0:0 sampled image 502 are sampled for luminance, but none of those pixels are sampled for chrominance. 4:0:0 may generally be thought of as being monochrome because it samples luminance but does not sample chrominance. While 4:0:0 may generally be thought of as being grayscale in that it typically is used to subsample only luminance values, it may be used to sample only some chrominance values in embodiments of the invention. That is, as described with respect to the accompanying figures, chrominance data (i.e., U or V instead of Y) may be sampled in a 4:0:0 scheme, so that that chrominance data is sampled, but neither the other chrominance data (i.e., the other of U or V) nor the luminance data is sampled.

Figure 6:
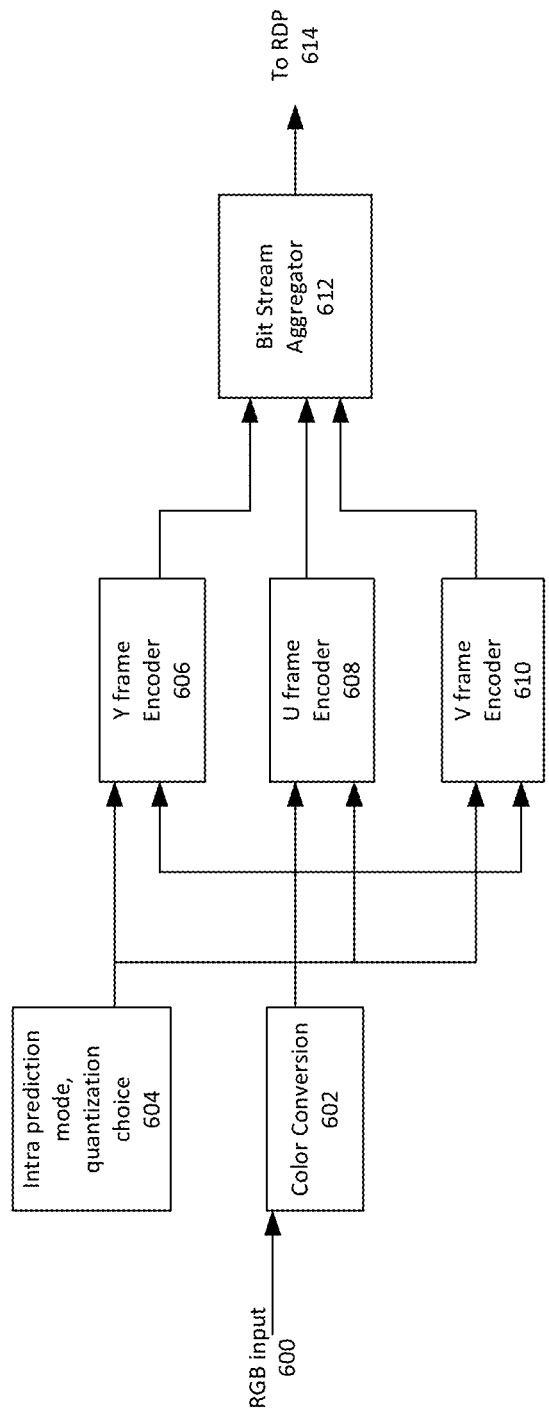
FIG. 6 depicts an example architecture for an encoder that implements embodiments of the invention.

FIG. 6 depicts an example architecture for an encoder that implements embodiments of the invention. The encoder architecture of FIG. 6 may be implemented, for instance in server 204 of FIG. 2, which conducts a remote presentation session with client 201 of FIG. 2, and which may implement the example architecture for a decoder depicted in FIG. 7. At various times during implementation of the invention, the example architecture of FIG. 6 may take an image such as image 300 of FIG. 3, and produce from it 4:4:4 sampled image 302 of FIG. 3, 4:2:0 sampled image 402 of FIG. 4, and/or 4:0:0 sampled image 502 of FIG. 5.

Initially, a frame of data is captured in RGB format and used as input 600 to the encoder. This frame of data may be captured, for instance, as GDI 246 of FIG. 2 passes its output to remote display subsystem 254 of FIG. 2, where the architecture of FIG. 6 is implemented in remote display subsystem 254.

Color conversion component 602 takes input frame 600 and both transforms it from RGB color space to YUV color space (sometimes referred to as Y'UV, YCbCr, or YPbPr), and creates three component frames from it—a Y component frame, a U component frame and a V component frame. These three component frames are then separately encoded by an encoder process or encoder processes. The Y, U and V values may be determined using the following relationships between them and RGB values:

$$Y=0.299*R+0.114*G+0.587*B$$

$$U=0.436(B-Y/0.886)$$

$$V=0.615(R-Y/0.701)$$

In embodiments, color conversion component 602 transforms input frame 600 from RGB color space to YUV color space. Color conversion component 602 then planarizes the YUV frame into three separate component frames—one each for the Y, U and V components. This may be accomplished such as by processing the YUV frame with a bit mask. For instance, where each pixel of the YUV frame is expressed using 24 bits (8 bits each for the Y, U, and V values), the Y component frame may be determined by logically AND'ing each pixel with a bitmask of 0xFF 00 00 (and the U and V frames with bitmasks of 0x00 FF 00 and 0x00 00 FF, respectively). In embodiments of the invention, a pixel may be expressed with a different number of bits than 24, such as 32 bits where an alpha value is represented using 8 bits.

In embodiments, the position of where the U and V values are stored within their respective component frames may be altered so that their value is stored at the beginning of each pixel's value. That is, each pixel of the U and V component frames may be logically bitwise shifted to the left, by 8 and 16 bits, respectively (using the 24 bit value example from above). For instance, a U component frame that contains a pixel with a value 0x00 FF 00 may be bitwise shifted to the left by 8 bits to produce a pixel with a value 0xFF 00 00. The 8 leftmost bits of the value are discarded, the 16 rightmost bits of the value are shifted 8 bits to the left, and 8 zeroes are appended to the value.

Embodiments of the invention may perform a bitwise shift on the U and V component frames because the encoders 608 and 610 are configured to perform 4:0:0 subsampling, where only those bits where the luminance value is conventionally located are subsampled. By bitwise shifting the U and V component frames so that their U and V values are stored in the leftmost portion of each pixel value, and encoder configured to perform 4:0:0 subsampling may be used to subsample these U and V component frames where the U and V values are not typically stored in the leftmost bits of a pixel's value.

Embodiments of the invention may not necessarily convert the input frame 600 from RGB color space to YUV color space, but more generally from a first color space to a second color space. Furthermore, in embodiments of the invention, the frame may not be converted from a first color space to a second color space at all. In embodiments of the invention where the input frame is generated in the same color space in which it is encoded by frame encoders 606-610, it may be that input frame 600 is not converted from a first color space to a second color space.

The Y, U and V component frames generated by color conversion component 602 are sent to frame encoders 606-610, respectively. The encoding component is depicted herein as being Y frame encoder 606, U frame encoder 608, and V frame encoder 610. This depiction is a logical depiction, and in embodiments of the invention, encoders 606, 608, and 610 may or may not be separate encoder processes or components. For example, where the encoder of FIG. 6 is implemented as a process on a multi-processor or multi-core computer system, encoders 606, 608 and 610 may be separate encoder processes. Where the encoder of FIG. 6 is implemented on a single-processor or single-core computer system, or has access to only one processor or core, encoders 606, 608 and 610 may be one encoder process that processes the Y, U and V frames in serial.

In addition to Y, U, and V component frames from color conversion component 602, encoders 606, 608, and 610 may also take input 604 as input, which signifies a mode for intra predictive encoding and/or quantization. Input 604 may signify a mode for intra predicting a 4×4 pixel luminescence block or for a 16×16 pixel luminescence block. In embodiments, the prediction for a 4×4 pixel block may be indicated by input 604 as vertical, horizontal, diagonal down-left, diagonal down-right, vertical right, horizontal down, vertical left, horizontal up, or DC. In embodiments, the prediction for a 16×16 pixel block may be indicated by input 604 as vertical, horizontal, plane, or DC.

In quantization, one or more least-significant bits of a value may be discarded to reduce the amount of space in which the value may be stored. In embodiments, quantization may be implemented by logically right shifting the value the specified number of bits. In embodiments of the invention, input 604 may indicate an amount of quantization to perform, and may be based on a target bit rate of the bit stream 614 that is sent to a client. In embodiments, the U and V values may be quantized by a greater amount than the Y values. This may be because humans are generally less able to perceive lack of chrominance information than luminance information, so chrominance data may be more easily discarded than luminance data without a perceptible loss of fidelity to the image.

Y frame encoder 606 outputs an encoded version of the Y component frame in 4:0:0 format. Y component frame may take image 300 of FIG. 3 and produce from it subsampled 4:0:0 image 502 of FIG. 5. Y frame encoder 606 may first sample the Y component frame with a 4:0:0 scheme, and then encode it, such as an I-frame of H.264 video. An I-frame is a frame that expresses a frame of video without using information from a prior frame or later frame. In contrast, a P-frame references data from a previous frame, and a B-frame references data from a previous frame and/or a subsequent frame.

Similar to the operations performed by Y frame encoder 606, U frame encoder 608 outputs an encoded version of the U component frame in 4:0:0 format, and V frame encoder 610 outputs an encoded version of the V component frame in 4:0:0 format. Each of encoders 606, 608 and 610 sends their encoded frame to bit stream aggregator 612.

Bit stream aggregator 612 encodes the encoded frames as a bit stream. Where H.264 video is being streamed to the client, this bit stream may comprise a stream of H.264 video. Bit stream aggregator 612 may generally take encoded frames and assemble them into a stream of data that is streamed to another computer across a computer network for display by that other computer.

Bit stream aggregator 612 may further encapsulate the bit stream before sending it to the client. As depicted, the frames may have been previously compressed via encoders 608-610, and may also be further compressed by bit stream aggregator 612. This may include bulk compression techniques, such as Lempel-Ziv compression (e.g. LZ77 compression). After aggregating the encoded component frames, bit stream aggregator 612 sends the encoded bit stream 614 to a RDP component (not depicted) that may then transmit the bit stream to a client (such as client 201 of FIG. 2) for decoding and display.

Figure 7:
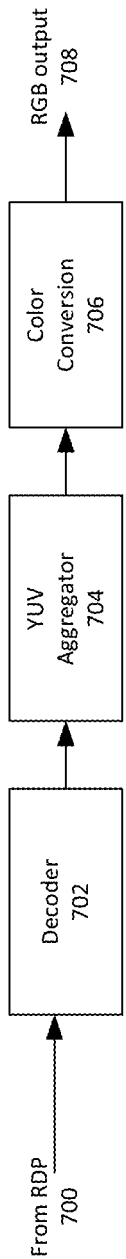
FIG. 7 depicts an example architecture for a decoder that implements embodiments of the invention.

FIG. 7 depicts an example architecture for a decoder that implements embodiments of the invention. The decoder architecture of FIG. 7 may be implemented, for instance in client 201 of FIG. 2, which conducts a remote presentation session with server 204 of FIG. 2, which implements the example architecture for an encoder depicted in FIG. 6. Network data 700 is received across a communications network. In embodiments, network data 700 is a representation of the encoded bit stream 614 of FIG. 6.

Network data 700 is decoded with decoder 702 to produce three component frames for each frame—Y component frame, U component frame, and V component frame. Where network data 700 is encoded as H.264 video and encapsulated with a remote presentation protocol, decoder 702 may un-encapsulate and decode network data 700. Decoder 700 may decode network data 700 into a representation of the Y, U and V component frames of a single frame, the Y, U and V components being in a 4:0:0 subsampling scheme. Network data 702 may be decoded into a representation of the component frames rather than a copy of the component frames where certain lossy encoding has been performed on the component frames prior to being sent as network data. For instance, the component frames may have been quantized before being sent as network data 700. In such a case where the component frames have been quantized, decoder 702 may not be able to recreate a duplicate of the component frames, but rather only a duplicate of the quantized component frames.

The three component frames produced with decoder 702 are then sent to frame aggregator 704, which aggregates the component frames into a single frame containing each of the component values. In embodiments, frame aggregator 704 may combine the component frames into a single frame by first bit-shifting the U and V component frames 8 and 16 bits to the right, respectively, and the logically OR'ing the three component frames.

In embodiments where component frames are marked with an indication of a frame number (e.g. where a single frame is divided into three component frames, each of those frames may be marked with an indication of the same frame), frame aggregator 704 determines the indication of a frame number of each component frame, and aggregates those component frames that share the same indication.

Frame aggregator 704 then sends the aggregated frame to color conversion component 706. Color conversion component is configured to convert a frame from a first color space to a second color space. Here, where the frame is received from frame aggregator 704 in YUV color space, and is to be displayed on a display device in RGB color space, color conversion component 706 may convert the frame from YUV color space to RGB color space. Color conversion component 706 may then output the frame in RGB color space 708 to such a display device for display.

Figure 8:
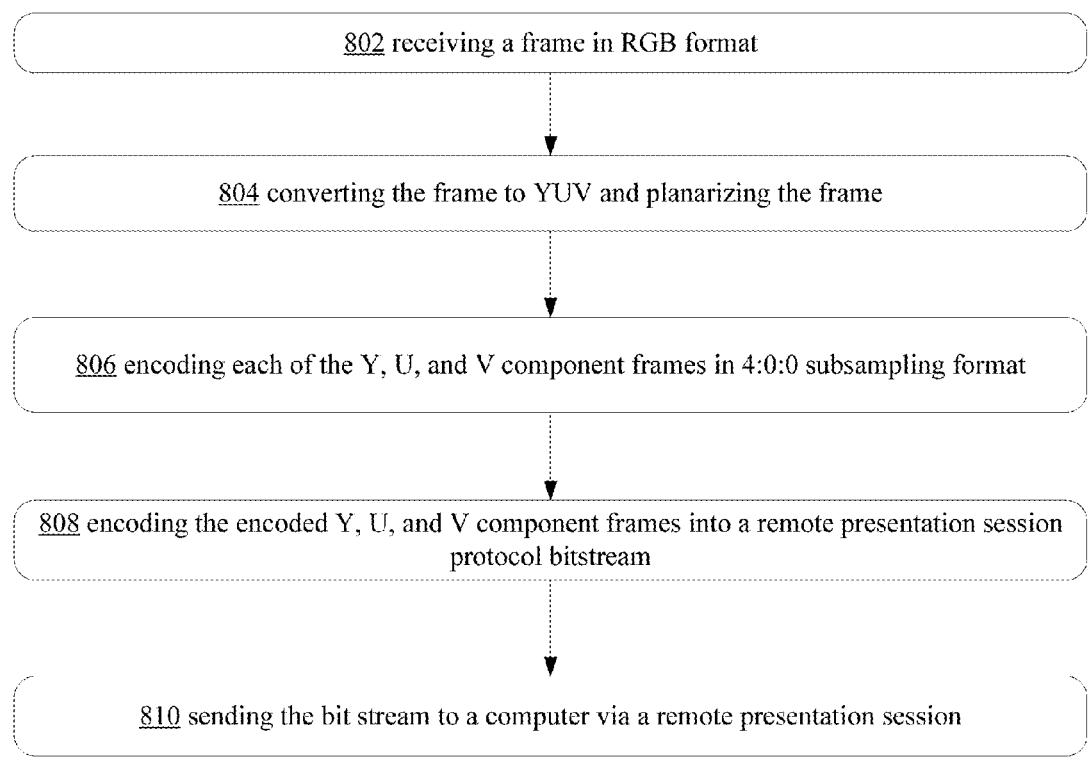
FIG. 8 depicts example operational procedures for an encoder that implements embodiments of the invention.

FIG. 8 depicts example operational procedures for an encoder that implements embodiments of the invention. In embodiments, the operational procedures of FIG. 8 may be implemented in remote presentation server 204 of FIG. 2. In embodiments of the invention, not all operational procedures of FIG. 8 are implemented, and/or the operational procedures of FIG. 8 are implemented in a different order than depicted. The same applies for the operational procedures of FIGS. 9-11, below.

Operation 802 depicts receiving a frame in RGB format. A frame in RGB format may be received in a similar manner as RDP input 600 of FIG. 6 is received by color conversion component 602 of FIG. 6.

Operation 804 depicts converting the frame to YUV and planarizing the frame, such as by converting the frame to a Y component frame, a U component frame, and a V component frame. Operation 804 may be implemented in a manner similar to how color conversion component 602 of FIG. 6 is implemented. In embodiments, operation 804 may be performed in response to determining that the frame is screen data. In embodiments, operation 804 includes marking each component frame of the frame with a shared indication, such that the three component frames may be identified as belonging to or originating from the same frame. In such embodiments, operation 804 may comprise marking each of the encoded Y, U, and V component frames with a reference to the frame.

Operation 806 depicts encoding each of the Y, U, and V component frames in 4:0:0 subsampling format. A 4:0:0 subsampling format may generally comprise subsampling a value of pixels of image data. Operation 806 may be performed using an encoder that is not configured to encode frames in a 4:4:4 subsampling scheme (one where each value of each pixel is individually sampled—e.g. each Y, U, and V value of each pixel is individually sampled), but is configured to encode frames in a subsampling scheme that does not separately sample each chrominance value, such as 4:2:0. Operation 806 may be implemented in Y frame encoder 606, U frame encoder 608, and V frame encoder 610 of FIG. 6. In embodiments, operation 806 comprises encoding each of the Y, U, and V component frames in the 4:0:0 subsampling scheme with a H.264 intra-encoder.

In embodiments, the encoding of operation 806 is performed based on a type of infra prediction. In such embodiments, operation 806 may comprise determining a level of intra prediction with which to encode each of the Y, U, and V component frames, and intra prediction encoding each of the Y, U, and V component frames with the encoder comprises based on the level of intra prediction. Such intra prediction encoding may be performed based on determining an amount of available computational resources that are available to a computer that implements the operational procedures of FIG. 8.

In embodiments, the encoding of operation 806 includes performing quantization. In such embodiments, operation 806 may include determining an amount of quantizing to quantize the encoded Y, U, and V component frames, and quantizing the encoded Y, U, and V component frames before encoding the encoded Y, U, and V component frames into the remote presentation session protocol bit stream. In embodiments, determining the amount of quantizing to quantize the encoded Y, U, and V component frames comprises determining a first amount of quantizing to quantize the Y component frames, and a second amount of quantizing to quantize the U and V component frames, the first amount of quantizing being less quantizing than the second amount of quantizing. In embodiments, determining the amount of quantizing to quantize the encoded Y, U, and V component frames is based on a target bit rate of the bit stream.

Operation 808 depicts encoding the encoded Y, U, and V component frames into a remote presentation session protocol bit stream. Operation 808 may be implemented in bit stream aggregator 612 of FIG. 6.

Operation 810 depicts sending the bit stream to a computer via a remote presentation session, the computer decoding the bit stream to produce a representation of each of the Y, U, and V component frames in 4:0:0 format, and combining the representation of each of the Y, U, and V component frames into a YUV frame in 4:4:4 format that the computer displays on a display device. The computer to which the bit stream is sent may be client 201 of FIG. 2.

Figure 9:
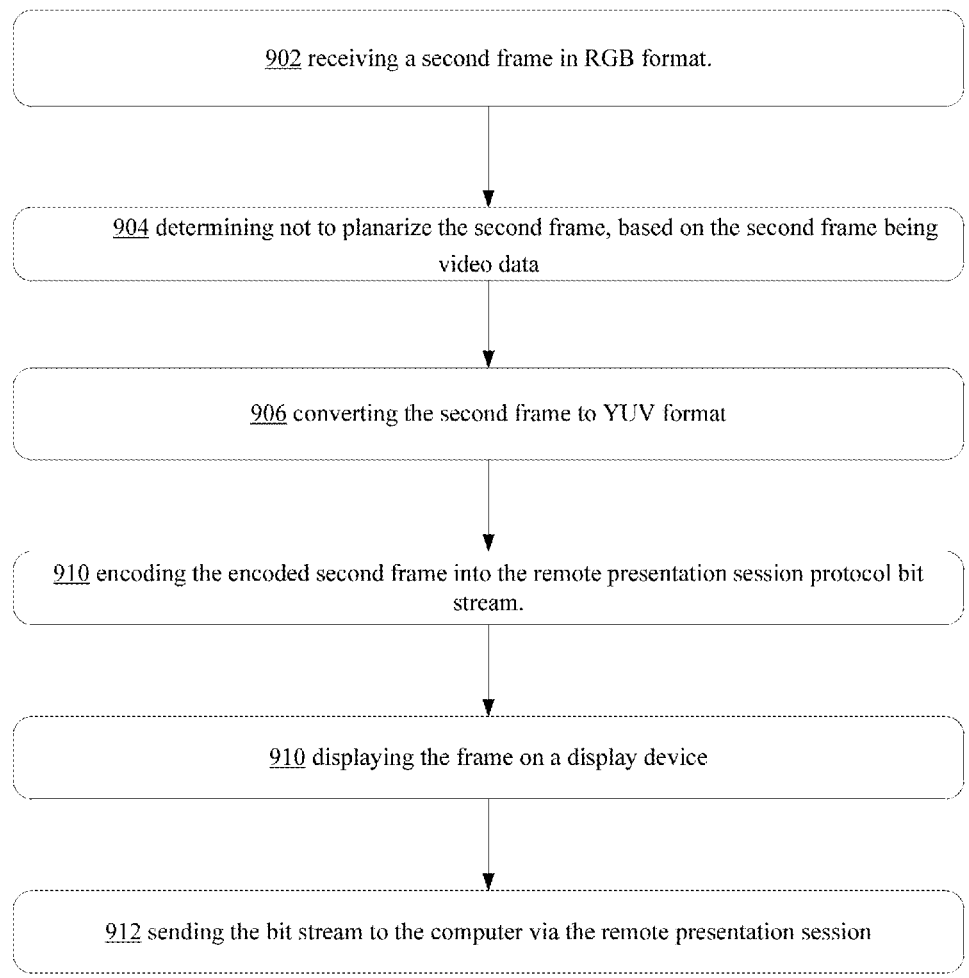
FIG. 9 depicts additional example operational procedures for an encoder that implements embodiments of the invention.

FIG. 9 depicts additional example operational procedures for an encoder that implements embodiments of the invention. The operational procedures of FIG. 9 may be implemented on the same computer that implements the operational procedures of FIG. 8—such as server 204 of FIG. 2. FIG. 8 depicts operational procedures where graphical data is encoded and sent to a client computer as video, where the client may recreate frames of received video in a 4:4:4 scheme, and FIG. 9 depicts operational procedures where graphical data is encoded and sent to a client computer as video in a scheme that involves less subsampling, such as video in a 4:2:0 scheme. Both the operational procedures of FIGS. 8 and 9 may be implemented on the same computer, and used within a single remote presentation session to encode different types of graphical data that is generated. That is, where the computer is encoding one type of data (such as screen data—the graphical output of a computer desktop—where there may be text present), the computer may use the operational procedures of FIG. 8, and where the computer is encoding another type of data (such as video), the computer may use the operational procedures of FIG. 9.

Operation 902 depicts receiving a second frame in RGB format. In embodiments, operation 902 may be effectuated in a similar manner as color conversion component 602 of FIG. 6 receives RGB input 600.

Operation 904 depicts determining not to planarize the second frame, based on the second frame being video data. In embodiments, operation 904 may comprise determining not to convert the frame into a second Y component frame, a second U component frame, and a second V component frame based on the second frame being video data. It may be that a frame is to be planarized into component frames and then encoded (so that a frame in a 4:4:4 subsampling scheme may be received by a client) where the frame is screen data that is likely to contain text, so fidelity carries with it a higher importance than with some other types of data. Here, the second frame is determined to be video data, so as a result, the frame may not be converted into its component frames.

Operation 906 depicts converting the second frame to YUV format. In embodiments, operation 906 may be implemented in color conversion component 602 of FIG. 6, though in such a case, color conversion component 602 may not planarize the second frame into component frames.

Operation 908 depicts encoding the converted second frame with the encoder. In embodiments, the second frame may be encoded by the encoder at something less than a 4:4:4 subsampling scheme—such as a 4:2:2 or 4:2:0 subsampling scheme. Regardless, the same encoder used in FIG. 8 to encode the component frames in a 4:0:0 subsampling scheme (and where they may be re-assembled later as representation of the frame in a 4:4:4 subsampling scheme) may be used in operation 908 to encode the second frame in a 4:2:0 subsampling scheme. In embodiments of the invention, encoding the second frame may comprise encoding the second frame into a frame of H.264 video.

Operation 910 depicts encoding the encoded second frame into the remote presentation session protocol bit stream. Operation 910 may be effectuated in a similar manner as how operation 808 of FIG. 8 is implemented.

Operation 912 depicts sending the bit stream to the computer via the remote presentation session. The computer may then display a representation of the second frame on the display device based on the bit stream. Operation 912 may be effectuated in a similar manner as how operation 810 of FIG. 8 is implemented.

Figure 10:
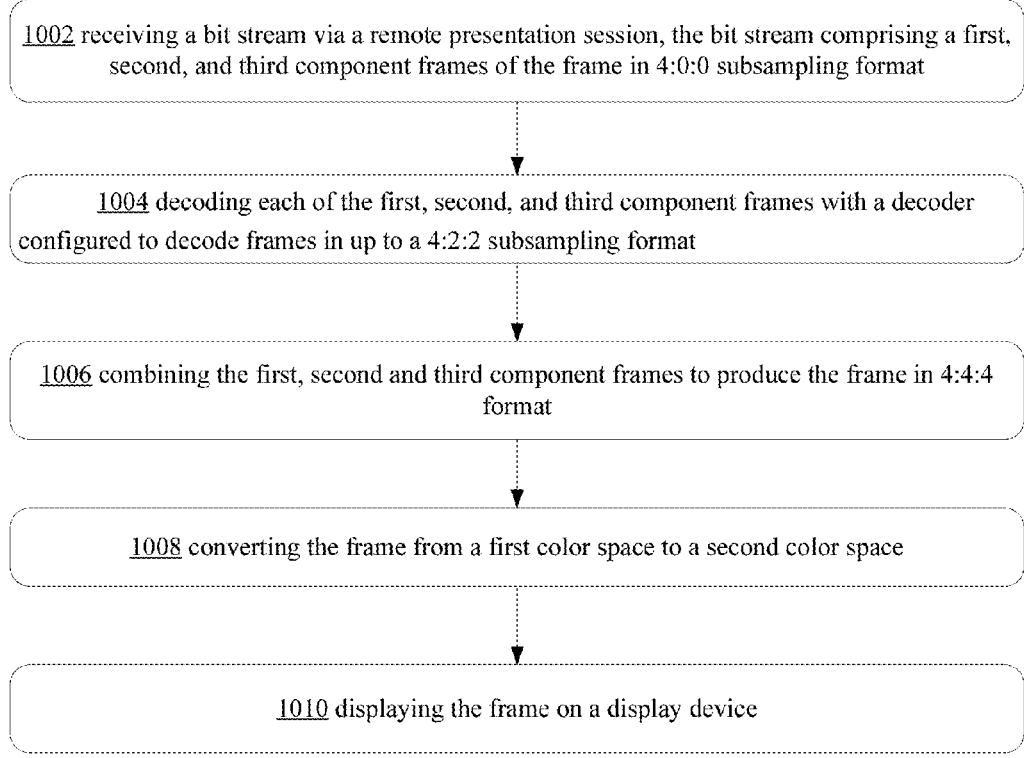
FIG. 10 depicts example operational procedures for a decoder that implements embodiments of the invention.

FIG. 10 depicts example operational procedures for a decoder that implements embodiments of the invention. In embodiments, the operational procedures of FIG. 10 may be used to implement the decoder of FIG. 7, and used to decode a bit stream generated by the encoder of FIG. 6.

Operation 1002 depicts receiving a bit stream via a remote presentation session, the bit stream comprising a first, second, and third component frames of the frame, each of the first, second, and third component frames being in 4:0:0 subsampling format. This may be the bit stream generated in operation 810 of FIG. 8. The first, second, and third component frames may be, respectively, Y, U, and V component frames of a YUV frame. In embodiments where the bit stream received via the remote presentation session is encapsulated with a remote presentation protocol, operation 1002 may include un-encapsulating the bit stream.

Operation 1004 depicts decoding each of the first, second, and third component frames, such as with a decoder. In embodiments, operation 1002 may be implemented in decoder 702 of FIG. 7. In embodiments, the decoder is not configured to decode frames in the 4:4:4 subsampling scheme, but the decoder is configured to decode frames in a 4:2:0 subsampling scheme.

Operation 1006 depicts combining the first, second and third component frames to produce the frame in 4:4:4 format. In embodiments, operation 1006 may be implemented in frame aggregator 704 of FIG. 7. In embodiments, operation 1006 may comprise combining the first, second, and third component frames through a logical OR operation. In embodiments, operation 1006 comprises determining to combine the first, second and third component frames based on the first, second, and third component frames each having an identifier of the second frame.

Operation 1008 depicts converting the frame from a first color space to a second color space. In embodiments, operation 1008 may be implemented in color conversion component 706 of FIG. 7. In embodiments, operation 1008 may comprise converting the frame from YUV color space to RGB color space before displaying the frame on the display device.

Operation 1010 depicts displaying the frame on a display device. Where the operational figures of FIG. 10 are implemented in computer 20 of FIG. 1, the displaying the frame on a display device may comprise displaying the frame on display 47 of FIG. 1.

Figure 11:
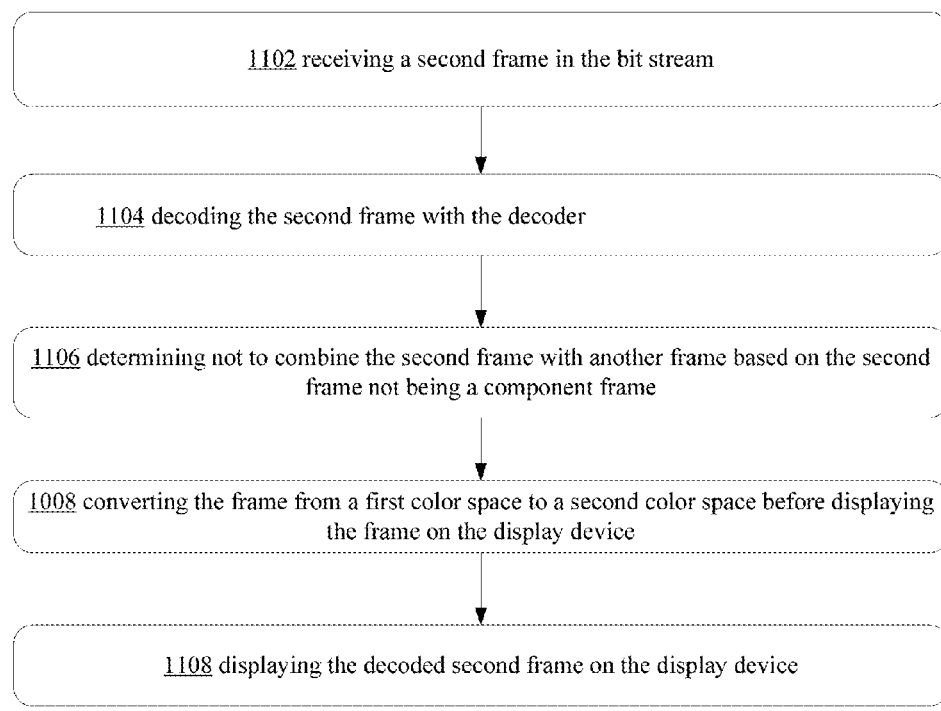
FIG. 11 depicts additional example operational procedures for an encoder that implements embodiments of the invention.

FIG. 11 depicts additional example operational procedures for an encoder that implements embodiments of the invention. The operational procedures of FIG. 11 may be implemented on the same computer that implements the operational procedures of FIG. 10—such as client 201 of FIG. 2. FIG. 10 depicts operational procedures that may be used to decode and aggregate component frames—such as those produced through implementing the operational procedures of FIG. 8. In contrast, FIG. 11 depicts operational procedures that may be used to decode a frame that has not been encoded and transmitted as component frames—such as those produces through implementing the operational procedures of FIG. 9.

Operation 1102 depicts receiving a second frame in the bit stream. In embodiments, the second frame is not in a 4:0:0 subsampling scheme, but rather is in a 4:2:0 subsampling scheme. Operation 1102 may be implemented in a similar manner as operation 1002 of FIG. 10 is implemented.

Operation 1104 depicts decoding the second frame with the decoder. In FIG. 8, the decoder was used to decode three component frames in a 4:0:0 subsampling scheme. Here, the second frame may also be decoded with this decoder, even though the second frame is in a different subsampling scheme than the component frames—for instance, a 4:2:0 subsampling scheme or a 4:2:2 subsampling scheme.

Operation 1106 depicts determining not to combine the second frame with another frame based on the second frame not being a component frame. Where component frames are received, such as in FIG. 10, they may be aggregated to produce a representation of their original frame. The second frame is not a component frame—it contains all of its components within a single frame. Since the second frame is not a component frame, in embodiments of the invention, it is not aggregated with any other frame. Determining that the second frame is not a component frame may be performed, for instance, by determining that the second frame is not in a 4:0:0 subsampling scheme. In embodiments of the invention where frames are tagged or marked with a frame indication or reference, determining that the second frame is not a component frame may be performed by determining that the second frame has been tagged or marked with a reference that indicates that it is not a component frame.

Operation 1108 depicts displaying the decoded second frame on the display device. Operation 1108 may be implemented in a similar manner as operation 1010 of FIG. 10 is implemented.

While the present invention has been described in connection with the preferred aspects, as illustrated in the various figures, it is understood that other similar aspects may be used or modifications and additions may be made to the described aspects for performing the same function of the present disclosure without deviating there from. Therefore, the present disclosure should not be limited to any single aspect, but rather construed in breadth and scope in accordance with the appended claims. For example, the various procedures described herein may be implemented with hardware or software, or a combination of both. The invention may be implemented with computer-readable storage media and/or computer-readable communication media. Thus, the invention, or certain aspects or portions thereof, may take the form of program code (i.e., instructions) embodied in tangible media, such as floppy diskettes, CD-ROMs, hard drives, or any other machine-readable storage medium. Likewise, the invention, or certain aspects or portions thereof, may be embodied in propagated signals, or any other machine-readable communications medium. Where the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method, comprising:

converting a frame of remote presentation session data comprising graphical data from RGB format to YUV format to produce a YUV frame;

dividing the YUV frame into three separate frames comprising a Y component frame, a U component frame, and a V component frame;

converting the frame to the Y component frame, the U component frame, and the V component frame based on determining that the frame comprises graphical data indicative of text;

encoding each of the separate Y, U, and V component frames in a second subsampling scheme with an encoder that is configured to encode a frame in the second subsampling scheme but is not configured to encode a frame in a first sampling scheme, wherein the second subsampling scheme comprises subsampling a subset of values of a pixel of a frame, the first subsampling scheme comprises individually sampling each value of a pixel of a frame;

encoding the encoded Y, U, and V component frames into a remote presentation session protocol bit stream; and sending the bit stream over a network to a client computer via a remote presentation session, the client computer decoding the bit stream to produce a representation of each of the Y, U, and V component frames, and combining the representation of each of the Y, U, and V component frames into a representation of the YUV frame that the client computer displays on a display device.

2. The method of claim 1, wherein encoding each of the Y, U, and V component frames in the second subsampling scheme with the encoder comprises:
encoding each of the Y, U, and V component frames in a 4:0:0 subsampling scheme with a H.264 intra-encoder.

3. The method of claim 1, wherein encoding each of the Y, U, and V component frames in the second subsampling scheme with the encoder comprises:
determining a level of intra prediction with which to encode each of the Y, U, and V component frames; and
intra prediction encoding each of the Y, U, and V component frames with the encoder comprises based on the level of intra prediction.

4. The method of claim 3, wherein determining the level of intra prediction comprises:
determining the level of intra prediction based on an amount of available computational resources.

5. The method of claim 1, further comprising:
determining an amount of quantizing to quantize the encoded Y, U, and V component frames; and
quantizing the encoded Y, U, and V component frames before encoding the encoded Y, U, and V component frames into the remote presentation session protocol bit stream.

6. The method of claim 5, wherein determining the amount of quantizing to quantize the encoded Y, U, and V component frames comprises:
determining a first amount of quantizing to quantize the Y component frames, and a second amount of quantizing to quantize the U and V component frames, the first amount of quantizing being less quantizing than the second amount of quantizing.

7. The method of claim 5, wherein determining the amount of quantizing to quantize the encoded Y, U, and V component frames comprises:
determining the amount of quantizing to quantize the encoded Y, U, and V component frames based on a target bit rate of the bit stream.

8. The method of claim 1, further comprising:
receiving a second frame in RGB format;
determining not to convert the frame into a second Y component frame, a second U component frame, and a second V component frame based on the second frame being in a subsampling scheme that involves less number of samples than the first subsampling scheme;
converting the second frame to YUV format;
encoding the converted second frame with the encoder;
encoding the encoded second frame into the remote presentation session protocol bit stream; and
sending the bit stream to the computer via the remote presentation session, the computer displaying a representation of the second frame on the display device based on the bit stream.

9. The method of claim 1, wherein the first subsampling scheme comprises a 4:4:4 subsampling scheme, and wherein the second subsampling scheme comprises a 4:2:2, a 4:2:0, or a 4:0:0 subsampling scheme.

10. The method of claim 1, further comprising:
marking each of the encoded Y, U, and V component frames with a reference to the frame before sending the bit stream to the computer; and
sending the bit stream to the computer via the remote presentation session, the computer combining each of the Y, U, and V component frames into the YUV frame based on each of the Y, U, and V component frames having the same reference.

11. A system, comprising:
a processor; and
a memory communicatively coupled to the processor when the system is operational, the memory bearing processor-executable instructions that, when executed on the processor, cause the system at least to:
receive over a network a bit stream via a remote presentation session, the bit stream comprising separately encoded first, second, and third component frames of a divided frame of graphical data of remote presentation session data from a server computer, wherein dividing the frame to the first, second, and third component frames based on determining that the frame comprises graphical data indicative of text, each of the encoded first, second, and third component frames being in a second subsampling scheme, wherein the second subsampling scheme comprises subsampling a subset of values of a pixel of a frame;
decode each of the encoded first, second, and third component frames with a decoder that is configured to decode frames in the second subsampling scheme but not configured to decode frames in a first subsampling scheme, wherein the first subsampling scheme comprises individually sampling each value of a pixel of a frame;
combine the decoded first, second, and third component frames to produce a representation of the frame of remote presentation session data; and
display the representation of the frame of remote presentation session data on a display device of a client computer.

12. The system of claim 11, wherein the memory further bears processor-executable instructions that, when executed on the processor, cause the system at least to:
convert the frame from a first color space to a second color space before displaying the frame on the display device.

13. The system of claim 12, wherein the processor-executable instructions that, when executed on the processor, cause the system at least to convert the frame from the first color space to the second color space before displaying the frame on the display device further cause the system at least to:
convert the frame from YUV color space to RGB color space before displaying the frame on the display device.

14. The system of claim 11, wherein the processor-executable instructions, that when executed on the processor cause the system at least to combine the first, second and third component frames to produce the frame in the first subsampling scheme further cause the system at least to:
combine the first, second, and third component frames through a logical OR operation.

15. The system of claim 11, wherein the decoder not configured to decode frames in the first subsampling scheme is configured to decode frames in a 4:2:0 subsampling scheme, the first subsampling scheme comprising a 4:4:4 subsampling scheme.

16. The system of claim 11, wherein the bit stream received via the remote presentation session is encapsulated with a remote presentation protocol, and wherein the processor-executable instructions that, when executed on the processor, cause the system at least to: receive the bit stream via the remote presentation session further cause the system at least to:
un-encapsulate the bit stream.

17. The system of claim 11, wherein the memory further bears processor-executable instructions that, when executed on the processor, cause the system at least to:
  determine to combine the first, second and third component frames based on the first, second, and third component frames each having an identifier of the frame.

18. The system of claim 11, wherein the second subsampling scheme is a 4:0:0 subsampling scheme, and wherein the memory further bears processor-executable instructions that, when executed on the processor, cause the system at least to:
  receive a second frame in the bit stream, the second frame being in a 4:2:0 subsampling scheme;
  decoding the second frame with the decoder;
  determining not to combine the second frame with another frame based on the second frame not being a component frame; and
  displaying the decoded second frame on the display device.

19. A hardware storage device bearing computer-readable instructions that, when executed on a computer, cause the computer at least to:
  receive a frame of remote presentation session data comprising graphical data in RGB format;
  divide the frame to a Y component frame, a U component frame, and a V component frame in response to a determination that the frame comprises graphical data indicative of text;
  encode each of the Y, U, and V component frames in a second subsampling scheme with an encoder that supports a second subsampling scheme but not a first subsampling scheme, the first subsampling scheme comprising individually sampling each value of a pixel of image data, the second subsampling scheme comprising sub sampling a subset of values of a pixel of the image data, the encoding of the U and V component frames comprising bitwise shifting each pixel of the U and V component frames;
  encode the encoded Y, U, and V component frames into a remote presentation session protocol bit stream; and
  send the bit stream to a client computer over a network via a remote presentation session, the client computer decoding the bit stream to produce a representation of each of the Y, U, and V component frames, and combining the representation of each of the Y, U, and V component frames into a YUV frame that the client computer displays on a display device.

* * * * *